United States Patent [19]

Nally et al.

[11] Patent Number: 5,440,683
[45] Date of Patent: Aug. 8, 1995

[54] VIDEO PROCESSOR MULTIPLE STREAMS OF VIDEO DATA IN REAL-TIME

[75] Inventors: Robert M. Nally, Plano; John C. Schafer, Wylie, both of Tex.

[73] Assignee: Cirrus Logic, Inc., Fremont, Calif.

[21] Appl. No.: 328,382

[22] Filed: Oct. 20, 1994

Related U.S. Application Data

[63] Continuation of Ser. No. 842,216, Feb. 26, 1992, abandoned.

[51] Int. Cl.[6] ............................................. G06F 15/00
[52] U.S. Cl. ..................................... 395/162; 395/164
[58] Field of Search .................................. 395/162–166

[56] References Cited

U.S. PATENT DOCUMENTS

| | | | |
|---|---|---|---|
| 4,730,212 | 3/1988 | Wojcik et al. | 358/83 |
| 4,916,640 | 4/1990 | Gasperi et al. | 382/45 |
| 4,970,663 | 11/1990 | Bedell et al. | 395/139 |
| 5,021,772 | 6/1991 | King et al. | 340/724 |
| 5,051,845 | 9/1991 | Gardner et al. | 360/14.1 |
| 5,088,053 | 2/1992 | Sprague et al. | 395/166 |
| 5,093,750 | 3/1992 | Park et al. | 360/19.1 |
| 5,136,717 | 8/1992 | Morley et al. | 395/800 |
| 5,197,140 | 3/1993 | Balmer | 395/400 |
| 5,210,836 | 5/1993 | Childers et al. | 395/375 |
| 5,226,125 | 7/1993 | Balmer et al. | 395/325 |
| 5,227,863 | 7/1993 | Bilbrey et al. | 358/22 |

FOREIGN PATENT DOCUMENTS

| | | |
|---|---|---|
| 0197154A1 | 10/1986 | European Pat. Off. . |
| 0217350A2 | 4/1987 | European Pat. Off. . |
| 0462805A2 | 12/1991 | European Pat. Off. . |
| 0463719A1 | 1/1992 | European Pat. Off. . |
| WO90/13876 | 11/1990 | WIPO . |

OTHER PUBLICATIONS

*The i750® Video Processor: A Total Multimedia Solution*, Kevin Harney et al., Communications of the ACM, 34 (191) Apr., No. 4, New York, pp. 65–78

Primary Examiner—Raymond J. Bayerl
Assistant Examiner—U. Chauhan
Attorney, Agent, or Firm—Winstead Sechrest & Minick

[57] ABSTRACT

A digital video editor employing a single chip special-purpose digital video processing unit (VPU) having the capability to combine several different digital video input signals into a single digital video output signal is disclosed. The VPU comprises a microprocessor operating under a set of instructions which is operative for receiving, storing and manipulating portions of an incoming digital video signal and a delay circuit, coupled to the microprocessor, for delaying execution of a particular instruction if a particular portion upon which the instruction is to operate has not yet been stored. The VPU processes multiple digitized video signals in real time in a time-sharing fashion because its processing speed is substantially greater than the rate at which it receives video data and processes multiple picture elements of a single digital stream simultaneously. In a preferred environment, The VPU operates in conjunction with an IBM compatible personal computer, an inexpensive general purpose computer. By processing video digitally, the VPU avoids generation loss and allows efficient digital compression and storage of video data.

20 Claims, 3 Drawing Sheets

VIDEO PROCESSOR MULTIPLE STREAMS OF VIDEO DATA IN REAL-TIME

This is a continuation of application Ser. No. 07/842,216, filed on Feb. 26, 1992, now abandoned.

TECHNICAL FIELD OF THE INVENTION

This invention relates to digital processing of video signals and, more specifically, to a digital video editor employing a single chip special-purpose digital video microprocessor having the capability to combine several different digital video input signals into a single digital video output signal.

BACKGROUND OF THE INVENTION

Video processing equipment, in the general sense, is not new. Television studios, for instance, have long been equipped with video editing units which have the capability to take a variety of video source signals and combine the source signals into a single output signal, which is usually a combination or composite of the source signals. Combination of the sources may occur in a variety of ways, ranging in complexity from simple switching from one source to another, as in changing scenes, to complex fades, wipes and dissolves, wherein one source is switched to another by a process of gradual replacement. These units also have the capacity to superimpose one source onto another. This facilitates the placing of titles over scenes and allows one to place an object from one scene onto a background found in another scene, known in the art as chroma-keying.

One such prior art system works in conjunction with an Amiga computer and takes four video inputs, allowing one to switch between the inputs. It does so by simply switching from one input to another, without a dissolve in between (termed an "A/B roller" in the art). As such, it does not allow for mixing or combining the inputs. All of the switching is done to analog signals with analog circuitry (in the analog domain). Following selection of a source by switching, the selected source is digitized to allow capture of a single screen of data from a stream of screens. The system is primarily designed to allow one to extract single frames of video from a source, in particular, to generate animated graphics for recording on video tape. Since it is primarily designed for capturing single screens of data, it is unsuitable for handling multiple streams of video data and is unable to combine such streams into a single output signal dynamically, and therefore fails to meet a need for such capability in the market.

The above-described prior art processes video in the analog domain. Analog processing of video shares the disadvantages found in processing other types of data in an analog fashion.

First is generation loss, whereby successive copies of the video data suffer from degradation due to repeated copying and processing. In other words, each successive copy of the data is worse than the last in terms of resolution and fidelity. In practical terms, one is limited to about three generations before resolution and fidelity become unacceptable. By manipulating the data digitally, the data are only subjected to one generation of loss as data are converted from analog to digital form and back again, thereby allowing an infinite number of manipulations in the digital interim.

Second, it is difficult and costly to store for later use and retrieve video data in analog form. It is far easier to convert the data to digital form and store it, perhaps after it has been subjected to a standard digital data compression algorithm.

Third, it is not possible to compress an analog video signal. Digital data can, therefore, be stored for later retrieval much more efficiently in a compressed form.

Finally, since special analog hardware must be designed for analog video processors such processors are expensive. Digital processors, on the other hand, can be used in conjunction with general purpose computers and can therefore make use of the computer's attendant equipment, thus taking advantage of existing hardware.

The aforementioned prior art is therefore limited to analog processing of data, with all of the attendant disadvantages of such processing. None of the above-described systems is able to combine several different digital video input signals into a single digital video output signal and act thereby as a digital video editor.

SUMMARY OF THE INVENTION

It is a primary object of this invention to provide a digital video processing unit ("VPU") comprising a microprocessor operating under a set of instructions operative for receiving, storing and manipulating portions of an incoming digital video signal and a delay circuit, coupled to the microprocessor, for delaying execution of a particular instruction if a particular portion upon which the instruction is to operate has not yet been stored.

Another object of the invention is to provide a digital VPU which processes digitized video signals in real time.

A further object of the invention is to provide a digital VPU which, because its processing speed is substantially greater than the rate at which it receives video data, can process multiple streams of digital data in a time-sharing fashion.

A still further object of the invention is to provide a digital VPU which processes multiple picture elements of a single digital stream simultaneously.

Another object of the invention is to provide a digital VPU comprising means for receiving two separate digitized video signals, means for separately storing portions of the digitized video signals and means for performing logical operations on the portions to thereby combine the separate digitized video signals into a single digitized video signal.

A further object of the invention is to provide a digital VPU which scales incoming video data to allow for more efficient processing of the data.

Still a further object of the invention is to provide a digital VPU which operates in conjunction with a general purpose computer so as to take advantage of the hardware already in place in such computer.

Yet a further object of the invention is to provide a digital VPU which operates in conjunction with a personal computer, a nearly ubiquitous, inexpensive general purpose computer.

Another object of the invention is to provide a digital VPU which comprises a special purpose video processor disposed on a single chip.

Still a further object of the invention is to provide a digital VPU which permits a viewer to view multiple video streams on a computer monitor simultaneously to allow the viewer to preview video data to best determine how it is to be processed.

Other objects and advantages of the present invention will be apparent upon reference to the accompanying description when taken into conjunction with the drawings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
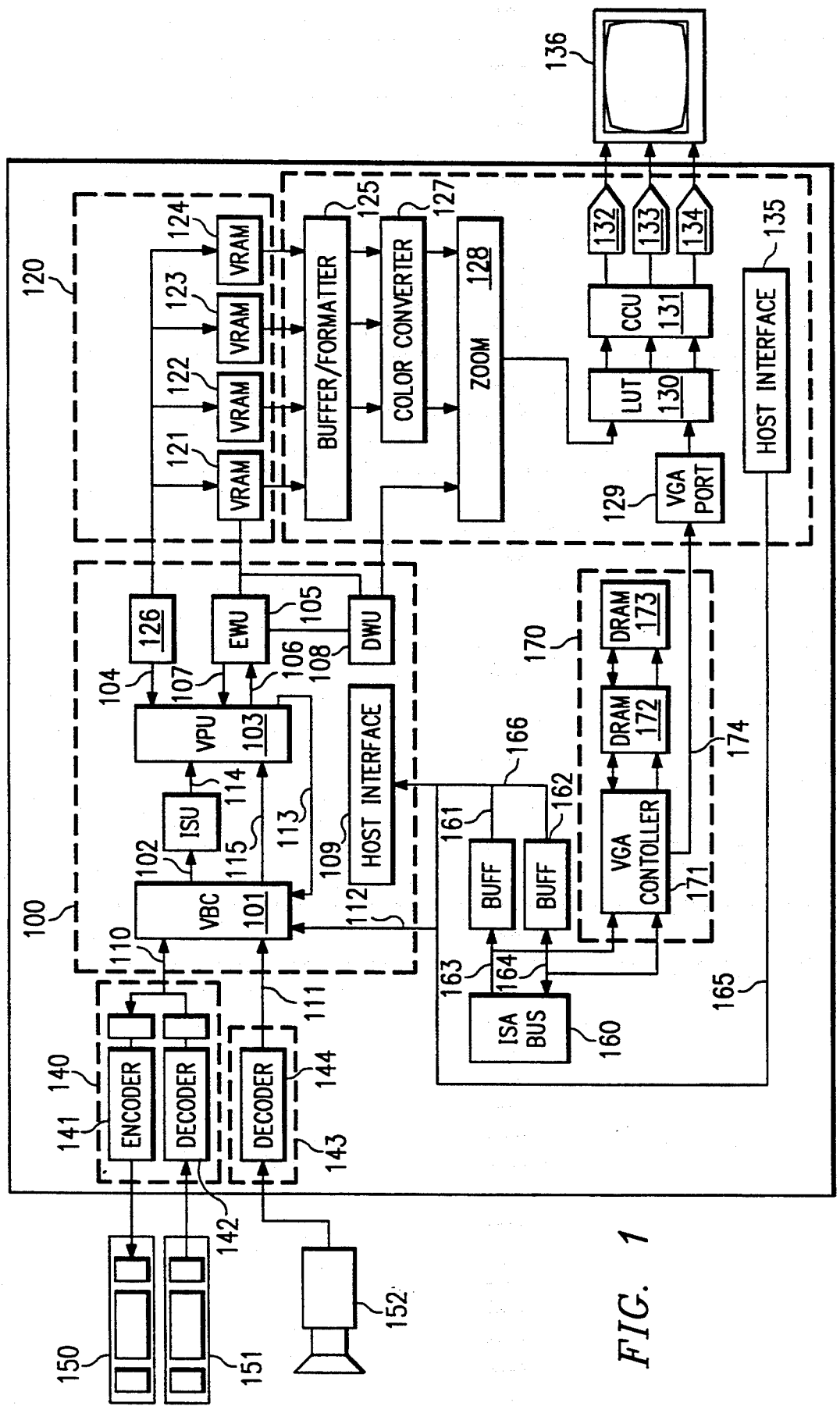
FIG. 1 is a block diagram of a digital video editing system, including a digital VPU.

Turning now to FIG. 1, which is a block diagram of a digital video editing system, shown is a video editing processor ("VEP") 100. The VEP 100, in the preferred embodiment, resides on a single chip and comprises a video bus controller ("VBC") 101, an input scaling unit ("ISU") 102, a VPU 103 (coupled to the ISU 102 via line 114 and to the VBC 101 via line 115), a pixel bus 104, an edit windowing unit ("EWU") 105 (coupled to the VPU by an input line 106 and an output line 107), a display write unit 108 and a host controller 109 and a decimator scaler 126, the functions and interrelations of which will be explained later.

The VBC 101 is equipped to handle three video signals (the signals representing streams or sequences of video data) at a time, namely video signals provided on input/output lines 110, 111, 112. The input/output line 110 is a pixel-by-pixel multiplexed (full duplex) line, meaning that in a single clock cycle, a pixel of information may be sent from the VBC 101 to an output device coupled to a particular line at the same time the VBC 101 receives a pixel of information from an input device coupled to the same line. Input/output line 111 is field multiplexed and input/output line 112 is multiplexed under software control (configurably multiplexed). Since video signals communicated on the input/output line 110 have a bandwidth of 15 megahertz, the input/output line 110 has the capability to handle a 30 megahertz bandwidth, thereby allowing full duplex operation.

Input line 110 is shown as coupled to an coder/decoder ("CODEC") 140, comprising a coder 141 and a decoder 142. Coder 141 is shown as coupled to a first video cassette recorder 150 and decoder 142 is shown as coupled to a second video cassette recorder 151.

The first and second video cassette recorders 150, 151 are easily available, off-the-shelf recorders, as found in many households. As is widely understood, the video cassette recorders 150, 151 may function as both input and output devices, as they can both record and play video tapes. However, they cannot do both at once, so in the context of the environment in which the present invention is intended to operate, the first video cassette recorder 150 will be treated as only an output device, while the second video cassette recorder 151 will be treated as only an input device.

Coder 141 is designed to take an analog video input signal, in this case a standard NTSC analog signal, and convert that signal into digital form, in this case a standard CCIR 601 (or D1) digital data stream. D1 is a recognized standard format in the video and broadcast field and is in wide use in equipment which is designed to process digitized video signals. Therefore, the present invention is compatible and designed for use with any equipment adhering to the D1 standard.

Input line 111 is shown as coupled to CODEC 143, comprising a decoder 144. Decoder 144 is shown as coupled to a video camera 152, which is generally understood to be an input device.

Although CODEC 140 and CODEC 143 are shown as attached to video cassette recorders and cameras, respectively, it should be clearly understood that this need not be the case. In fact, any equipment capable of transmitting or receiving analog video signals in a format compatible with the decoders is attachable to the video editing unit and is within the scope of the present invention. Furthermore, since CODEC 140 and CODEC 143 are separable from the YEP 100 (in the sense that they are not on the same chip), they may be likewise substituted. For instance, CODEC 140 may be replaced by a digital compression chipset, allowing the video signals, while still in their digital D1 format, to be compressed in one of a variety of well understood ways into a format which allows for more efficient storage of the signals on computer peripheral hardware for retrieval at a later time. For applications not requiring data compression, a digital input/output storage device may be coupled directly to the VEP 100. All of these possibilities are within the realm of the present invention.

Input line 112 is coupled to a host interface 109. The host interface 109 is designed as an interface to a personal computer 160, which is IBM compatible in the preferred operating environment of the present invention. However, it should be understood that any general purpose computer, whether it be a microcomputer or otherwise, is adaptable to work in conjunction with the present invention. Thus, the present invention is not limited in scope by the computer with which it may operate in a particular application. The host controller 109 is coupled to the computer 160 via buffers 161 and 162, handling address and data, respectively. Buffers 161 and 162 are coupled to computer 160 via buses 163 and 164, respectively. The IBM compatible computer 160 is designed to carry addresses and data on different buses, hence the need for two buses 163, 164 and two buffers 161, 162. The host controller 109, however, contains a multiplexer (not detailed therein) which multiplexes the address and data to be communicated on a single bus 166.

The computer 160 is also coupled to a video driver card 170, containing a video graphics adaptor ("VGA") controller 171 and video frame buffers 172, 173. The video driver card 170, with its controller 171 and buffers 172, 173, is an off-the-shelf item and therefore familiar to those skilled in the art.

Proceeding now through the remainder of FIG. 1, the VBC 101 is coupled to the ISU 102, which is, in turn, coupled to the VPU 103 via line 114. The VBC 101 is also coupled directly to the VPU 103 via line 115, as shown. Thus, there are two paths from the VBC 101 to the VPU 103. Multiplexing controls within the VBC 101 (not detailed therein) direct which of the digitized video signals are to be processed through the ISU 102 before being sent to the VPU 103, and which signals can go straight through to the VPU 103 from the video bus unit 101 to the VPU 103 via line 115.

The VPU 103 sends data through pixel bus 104 and decimator scaler 126 to frame buffer 120, which will be explained later.

The ISU 102 is designed to take an incoming digital signal representing an entire frame of video data and to scale that frame down to some fraction of a frame. In other words, the ISU 102 contracts a video frame to allow it to be more easily manipulated in the VPU 103, as a matter of convenience and efficiency. It should be understood, however, that the VPU 103 does not require the existence of the ISU 102 and, accordingly, the present invention is independent of any preprocessing scaling which might take place in the environment in which the preferred embodiment is designed to operate.

The EWU 105 works in conjunction with the VPU 103 by providing counter status information so the VPU 103 can determine termination conditions, as will be described later. The EWU 105 also generates addresses for the data that the VPU 103 processes. The link between the VPU 103 and the EWU 105 is bidirectional (along different buses 106, 107) to allow the EWU 105 to know when it is to change the state of counters (not detailed therein) in response to actions taken in the VPU 103. The VPU 103 contains a clock (not detailed therein) which provides a clock signal to the VPU 103 and, through a clock out port (not shown), to the other components within the YEP 100.

Finally, the VPU 103 includes an output line 113, which allows the VPU 103 to send a processed video signal out to the VBC 101 for further routing to an output or storage device, as previously detailed.

Also shown is frame buffer 120, comprising individual video random access memory ("VRAM") 121, 122, 123, 124, also known as dual-port RAM. The frame buffer 120 stores data sent to it by the VEP 100.

Also shown is a digital to analog converter ("DAC") comprising a format processor 125, a convert processor 127, a zoom processor 128, a VGA converter 129, a look-up table 130, a cursor control 131, RGB controllers 132, 133, 134 and a host interface 135. The DAC receives frames sent to it from the frame buffer 120 scaled down to fit within a fraction of a monitor 136 (described later) to thereby allow one to see multiple frames of data on the same computer screen. The DAC formats, converts and zooms data sent to it by the decimater scaler 126, VRAM 121, 122, 123, 124, format processor 125, convert processor 127 and zoom processor 128, coupled as shown. Data which have been previously scaled by the ISU 102 and/or decimator scaler 126 are interpolated to any selectable scale by these three processors 125, 127, 128. Once the data have been restored to original scale, the data are passed to look-up table 130, combined with data generated by the computer 160 and passed from the video graphics array controller 171 via a line 174. From the look-up table 130, the combined data are passed through hardware cursor control 131 and through RGB controllers 132, 133, 134 to a monitor 136 for display. In this fashion, the data are windowed to give the person who is editing a chance to see all of the signals prior to processing. This allows the person to make intelligent decisions concerning how he wants to process the signals.

Figure 2:
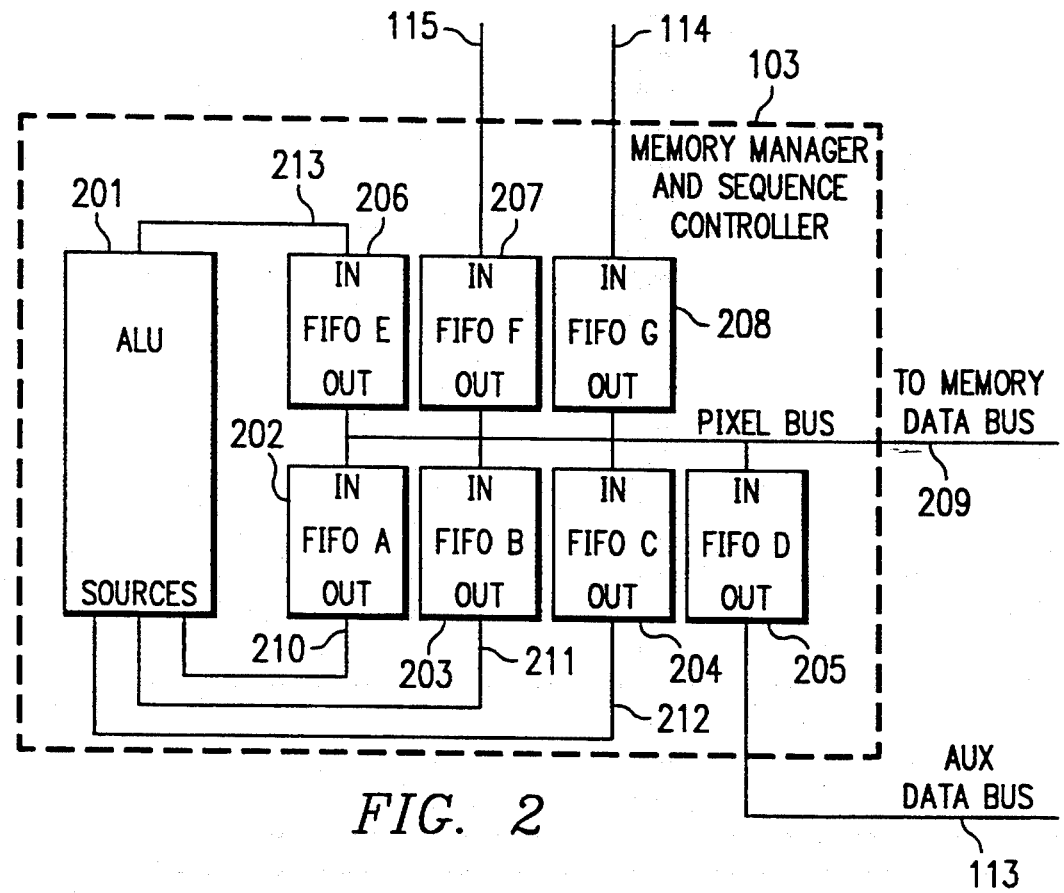
FIG. 2 is a block diagram of the digital VPU of FIG. 1.

Turning now to FIG. 2, which is a block diagram of the digital VPU 103 of FIG. 1, shown are an arithmetic and logic unit ("ALU") 201 and first-in first-out (fifo) registers 202, 203, 204, 205, 206, 207 and 208. Each of the registers 202–208 is unidirectional, meaning that they each have separate input and output lines. A pixel bus 209 couples the registers 202–208 together to various edit window registers in the EWU 105 of FIG. 1 (not shown in FIG. 2). The edit window registers are bidirectional and, accordingly, can take data from registers 206–208 and give data to registers 202–205. The ALU 201 can receive input from registers 202–204 through lines 210–212, respectively. Register 206 receives its input from the ALU 201 via line 213. Registers 207 and 208 receive input from the VBC 101 and ISU 102, both of FIG. 1, via lines 115 and 114, respectively.

During operation, data streams from the VBC 101 arrive in registers 207 and 208. Instructions, which will be detailed later, direct the ALU 201 to move the data from the registers 207 and 208 to a particular edit window within the EWU 105. The instructions can further move data from the edit windows to a particular register, from one particular register to another and to and from the ALU 201, depending upon the operands of the instructions. In this manner, video data, which arrive in real time, can be moved and operated upon to produce a single video output stream, which is delivered from register 205 to the VBC 101 via line 113. The ALU 201 allows the VPU 103 to perform arithmetic and logic operations on the data stored in the registers 202–204. In fact, the common operations available in a general purpose microprocessor are available (ADD, SUBTRACT, AND, OR, XOR and NOT, among others). These operations, when applied to bytes representing the attributes (color, luminance, chrominance or others) of a particular pixel or a group of pixels, change the attributes so as to effect a change in the output signal, thereby changing the appearance of the output frame, whether that change be a dissolve, superimposition or other combination of input signals.

One important feature of the VPU 103 is that it has the capacity to determine when the registers 207, 208 contain data to be processed. Since the video data arrive in real time and not in synchronization with the clock driving the VPU 103, it is possible that a particular instruction will direct the VPU 103 to fetch data from a particular register which has not yet received the data to be fetched. The ALU 220 continuously polls the registers to see whether they contain data which have yet to be processed. Upon reaching an instruction that cannot yet be carried out, the VPU 103 will simply mark the instruction as being unprocessed and will instead process the next instruction in line. Since the VPU 103 performs its instructions in a loop, the VPU 103 will have another chance to process the marked instruction on the next pass through the loop. In this manner, the VPU 103 need not wait for a particular datum to arrive, it just continues on. As a practical matter, the data always arrives within one cycle. In other words, the VPU 103 may, at various times, be processing data in different cycles of the same loop. This feature allows the VPU 103 to process data more efficiently.

Another feature which is critical to the operation of the VPU 103 is that its clock rate is set a multiple of the rate at which data are incoming from the sources. In this way, the VPU 103 can process the data in a time-sharing fashion, thereby appearing to process the data in parallel. This feature works in concert with the instruction-skipping feature described above, assuring that in no event will the VPU 103 appear not to be able to handle the incoming data in real time.

Figure 3:
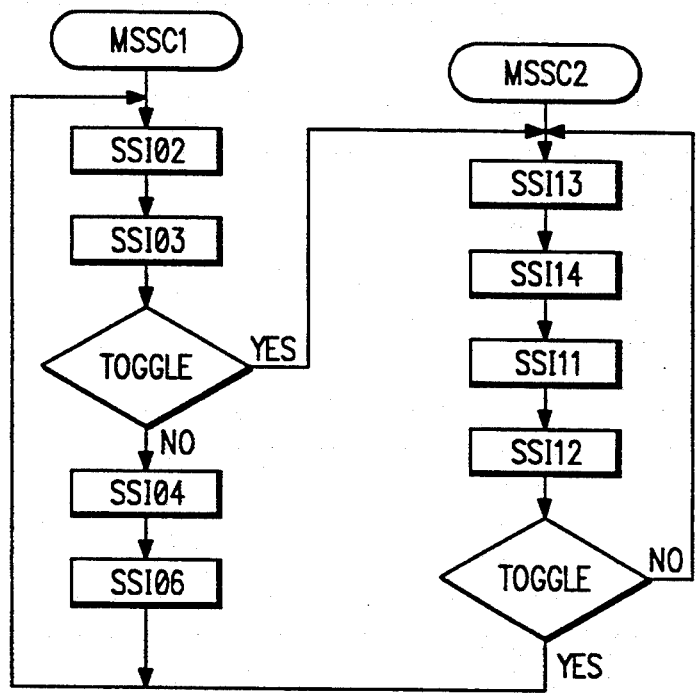
FIG. 3 is a flow chart of a sequencer dynamic control unit, a part of the digital VPU.

Turning now to FIG. 3, which is a flowchart of a sequencer dynamic control unit, a part of the ALU 201 of FIG. 2, shown are entry points (called "master span state controls" and referred to herein as "MSSC1" and "MSSC2", together termed "MSSCn"). The entry points are followed by serially processed span state instructions ("SSI") residing in registers. Finally, there are termination points which, when conditions are met, provide an exit from a particular loop.

Note that there are two loops: one, starting at MSSC1, corresponding to an odd line of video and another, starting at MSSC2, corresponding to an even line of video. The odd and even lines form odd and even video fields. Because video lines are interlaced, the odd and even lines in a particular frame of video are processed at different times. As shown, processing starts at MSSC1 on an odd line of video, proceeding through SSI's operating on the odd line until it ends, at which time termination conditions are met and the "Toggle" termination point routes processing over to MSSC2, for the even line of video. Processing continues in MSSC2 until its termination conditions are met, when processing is again returned to MSSC1.

Recalling the above feature of instruction-skipping, if, for instance, instruction SSI14 has been marked for execution on the subsequent pass of the loop, the loop will not terminate processing until instruction SSI14 has been processed and there is no more data in the even line to be processed.

Figure 4:
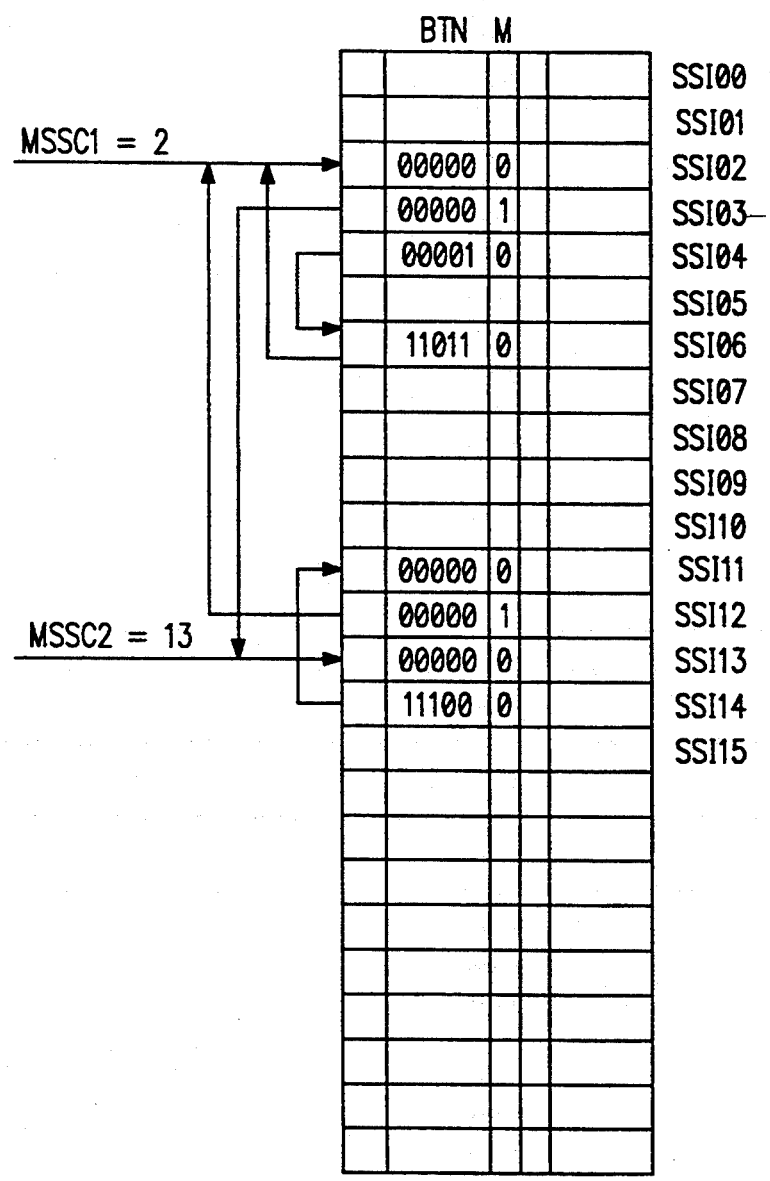
FIG. 4 is a diagram of memory registers in the sequencer dynamic control unit.

Turning now to FIG. 4, which is a diagram of memory registers in the sequencer dynamic control unit, shown are SSI instructions residing in registers 00 through 15, with their corresponding MSSCn, M and BTN controls. There are three things that control program flow within the SSI: the BTN and M fields in the SSI and the MSSC1 and MSSC2 fields in a sequencer master control register. The sequencer toggles between MSSC1 and MSSC2 operations. MSSC1 and MSSC2 are absolute addresses in the SSI unit and are not treated as vectors.

The M field in the SSI flags a loop exit point. Whenever the SSI unit detects a video field toggle state, it will continue fetching and executing instructions pointed to by the BTN field until it finds an instruction with M=1. The SSI will execute the instruction with M=1 before branching to the other MSSC loop. Every MSSC loop must have an exit point (i.e. an instruction with M=1), or else the sequencer will process both video fields with the same MSSC loop.

The BTN field in the SSI is a step or branch vector. The next instruction to be fetched and executed is at a displacement from the current instruction by BTN+1. If BTN=0, the sequencer just steps to the next instruction. If BTN=31, the sequencer will lock on the current instruction and repeat it until the sequencer is reprogrammed or turned off.

From the foregoing description it is apparent that the invention described provides a novel VPU comprising a microprocessor operating under a set of instructions operative for receiving, storing and manipulating portions of an incoming digital video signal and a delay circuit, coupled to the microprocessor, for delaying execution of a particular instruction if a particular portion upon which the instruction is to operate has not yet been stored.

Although the present invention and its advantages have been described in detail, it should be understood that various changes, substitutions and alterations can be made herein without departing from the spirit and scope of the invention as defined by the appended claims.

What is claimed is:

1. A video processing unit, comprising:
   at least one input first-in-first-out register for receiving and storing portions of a digital video signal;
   a plurality of second first-in-first-out registers for receiving and storing ones of said portions received from said at least one input first-in-first-out register;
   means for selectively coupling in response to instructions said ones of said portions from said at least one input first-in-first-out register to ones of said second first-in-first-out registers; and
   an arithmetic and logic unit for processing instructions which operate on selected ones of said portions received from said second plurality of first-in-first-out registers, said arithmetic and logic unit including means for delaying execution of a particular instruction and executing another instruction if a poll of said at least one first-in-first-out register determines that a particular required one of said portions of said digital video signal has not been received and stored by said at least one input first-in-first-out register.

2. The video processing unit as recited in claim 1 wherein said at least one input register comprises a plurality of input first-in-first-out registers, each of said input first-in-first-out registers for receiving a one of multiple streams of digital data, said video processing unit processing said multiple streams of video data.

3. The video processing unit as recited in claim 1 wherein said video processing unit processes multiple picture elements of a single digital stream received by a single said input register simultaneously.

4. The video processing unit as recited in claim 1 wherein said digital video signal comprises scaled incoming video data.

5. The video processing unit as recited in claim 4 wherein said video processing unit operates in conjunction with a general purpose computer.

6. The video processing unit as recited in claim 5 wherein said video processing unit operates in conjunction with a general purpose microcomputer.

7. The video processing unit as recited in claim 6 wherein said video processing unit comprises a special purpose video processor disposed on a single chip.

8. The video processing unit as recited in claim 7 wherein said video processing unit permits a viewer to view display data corresponding to said multiple video signals on a computer monitor to allow said viewer to determine how said video signals are to be processed.

9. A video processing unit, comprising:
   a microprocessor operating under a set of instructions operable to receive, store, and manipulate at least a portion of at least one incoming digital real-time video signal including:

an input first-in-first-out register having an input for receiving said at least one incoming digital real-time video signal;

means for selectively coupling a portion of said at least one real-time digital video signal output from said input first-in-first-out register to an input of at least one of a plurality of second first-in-first-out registers;

an arithmetic and logic unit having a plurality of inputs each coupled to an output of a corresponding one of said plurality of second first-in-first-out registers for operating on ones of said portions of said real-time video signal received from said corresponding ones of said plurality of second first-in-first-out registers;

an output first-in-first-out register having an input coupled to an output of said arithmetic and logic unit for outputting a video signal resulting from operations performed on said ones of said portions by said arithmetic and logic unit; and means for delaying execution of a particular instruction and executing another instruction if a poll of said input first-in-first-out register determines that a particular portion of said real-time video signal on which said particular instruction is to operate has not yet been stored in said input first-in-first-out register.

10. The video processing unit as recited in claim 9 wherein said video processing unit processes multiple picture elements of a single digital real-time video signal simultaneously.

11. The video processing unit as recited in claim 10 wherein said video processing unit receives scaled incoming video data.

12. The video processing unit as recited in claim 11 wherein said video processing unit operates in conjunction with a general purpose computer.

13. The video processing unit as recited in claim 12 wherein said video processing unit operates in conjunction with a general purpose microcomputer.

14. The video processing unit as recited in claim 13 wherein said video processing unit comprises a special purpose video processor disposed on a single chip.

15. The video processing unit as recited in claim 14 wherein said video processing unit permits a viewer to view multiple real-time video signals on a computer monitor simultaneously to allow said viewer to preview video data to determine how it is to be processed.

16. The video processing unit as recited in claim 9 and further comprising a second input first-in-first-out register for receiving a second video signal, said means for coupling further operable to couple a portion of said second video signal output from said second input first-in-first-out register to an input of at least one of said plurality of second first-in-first-out registers thereby allowing said video processing unit to process multiple streams of video data.

17. A video processor comprising:

first and second input first-in-first-out registers each for receiving a corresponding real-time digitized video signal;

a bus coupled to an output of each of said first and second input first-in-first-out registers;

a plurality of second first-in-first-out registers each having an input coupled to said bus for storing portions of said real-time digitized video signals output from said first and second input first-in-first-out registers; and an arithmetic logic unit for performing serially processed loops of arithmetic and logical operations on ones of said portions output from said plurality of second first-in-first-out registers, said arithmetic logic unit delaying performance of a current one of said arithmetic and logical operations and performing another one of said arithmetic and logical operations of a one of said serially processed loops if a poll of said first and second input first-in-first-out registers determines that a one of said portions required by said arithmetic logic unit during said current one of said arithmetic and logical operations has not been stored in a one of said first and second input first-in-first-out registers.

18. The video processor of claim 17 and further comprising a first-in-first-out register having an input coupled to an output of said arithmetic logic unit and an output coupled to said bus for controlling exchange of results of operations performed by said arithmetic and logic unit from said arithmetic and logic unit to said bus.

19. The video processor of claim 17 and further comprising a first-in-first-out register having an input coupled to said bus and an output coupled to a second bus for controlling the transfer of ones of said portions from said first bus to said second bus.

20. The video processor of claim 17 wherein said processor is operable to delay performance by said arithmetic and logic unit of an operation selected by an instruction under execution when a required one of said portions has not been stored in a corresponding one of said plurality of second first-in-first-out registers.

* * * * *